United States Patent
Kitchloo et al.

(10) Patent No.: US 6,719,812 B1
(45) Date of Patent: Apr. 13, 2004

(54) INFUSION OF DYE USING A PLASTICIZER

(75) Inventors: Paresh V. Kitchloo, North Attleborough, MA (US); Robert A. Sallavanti, Dalton, PA (US)

(73) Assignee: Gentex Optics, Inc., Carbondale, PA (US)

( * ) Notice: Subject to any disclaimer, the term of this patent is extended or adjusted under 35 U.S.C. 154(b) by 0 days.

(21) Appl. No.: 09/547,088

(22) Filed: Apr. 11, 2000

(51) Int. Cl.$^7$ ................................................ D06P 5/00
(52) U.S. Cl. ...................... 8/485; 8/445; 8/449; 8/495; 264/1.38; 264/1.36; 264/74; 264/136; 264/137; 264/405; 430/280.1; 430/304
(58) Field of Search ............................. 8/485, 445, 449, 8/495; 264/1.38, 1.36, 74, 136, 137, 405; 430/280.1, 304

(56) References Cited

U.S. PATENT DOCUMENTS

| | | | |
|---|---|---|---|
| 3,821,148 A | 6/1974 | Makowski et al. | |
| 3,821,149 A | 6/1974 | Makowski et al. | |
| 4,043,637 A | 8/1977 | Hovey | |
| 4,228,205 A * | 10/1980 | Hedecek et al. | 428/35 |
| 4,323,597 A | 4/1982 | Olson | |
| 4,657,345 A | 4/1987 | Gordon | 350/311 |
| 4,923,909 A | 5/1990 | Kuo et al. | |
| 4,980,221 A | 12/1990 | Kobayashi et al. | |
| 5,257,491 A * | 11/1993 | Rouyer et al. | 53/428 |
| 5,268,231 A | 12/1993 | Knapp-Hayes | |
| 5,453,100 A | 9/1995 | Sieloff | |
| 5,648,190 A * | 7/1997 | Kato et al. | 430/47 |
| 5,716,900 A * | 2/1998 | Krozer et al. | 503/227 |
| 5,824,464 A * | 10/1998 | Schell et al. | 430/533 |
| 5,910,375 A * | 6/1999 | Perker et al. | 428/520 |
| 5,968,207 A | 10/1999 | Li | |
| 6,162,574 A * | 12/2000 | Kobayashi et al. | 430/157 |

FOREIGN PATENT DOCUMENTS

| | | |
|---|---|---|
| EP | 0 141 407 | 5/1985 |
| EP | 0 322 556 | 7/1989 |

* cited by examiner

Primary Examiner—Yogendra N. Gupta
Assistant Examiner—D G Hamlin
(74) Attorney, Agent, or Firm—Keusey, Tutunjian & Bitetto, P.C.

(57) ABSTRACT

A method of infusing a dye into the surface of an article formed of a plastic material comprises contacting the surface with a solution including one or more solvents each aggressive to the plastic material, one or more dyes and one or more substances each capable of plasticizing the plastic material. If the plastic material is polycarbonate, then the aggressive solvent may be one or more chlorinated hydrocarbons. The dye may be a photochromic dye, a cosmetic tinting dye, dyes for absorbing infrared, laser and ultraviolet radiation, or combinations thereof. A wide range of plasticizers has been investigated. The article is contacted by the solution for ten seconds to one minute; and nearly all the infused solvent is then evaporated from the article by heating. The use of one or more plasticizers reduces or eliminates bubbling or hazing of the contacted surface during solvent evaporation. The dyed article comprises a surface layer having a depth of the order of magnitude of 100 microns containing one or more dyes, one or more plasticizers and, likely, a trace amount of the one or more aggressive solvents.

29 Claims, No Drawings

INFUSION OF DYE USING A PLASTICIZER

FIELD OF THE INVENTION

The invention relates to the infusion of dyes into the surface of an article formed of a plastic material using one or more substances each capable of plasticizing the material. More particularly, it relates to treating the surface of an article formed of a plastic material with a solution comprising one or more solvents each aggressive to said material, one or more dyes, and one or more substances capable of plasticizing the material.

BACKGROUND OF THE INVENTION

Attempts have been made to introduce dyes into articles formed of a plastic material. For optical articles such as lenses, a thermoplastic frequently employed is polycarbonate, which is a condensation product resulting typically from the reaction of bisphenol A derivatives with phosgene. Many dyes degrade at the high molding temperature of polycarbonate. Accordingly it would be advantageous to treat the plastic article after it has been formed.

U.S. Pat. No. 4,657,345 to Gordon utilizes aggressive solvents in combination with various heating steps. However, such surface defects as bubbling, hazing and crazing are caused by retained solvent. U.S. Pat. No. 5,453,100 to Sieloff combines an aggressive solvent with a moderating solvent which acts to dilute and reduce the aggressiveness of the infusing solvent. This approach decreases the volatility of the solvent making it more difficult to drive off, resulting in increased bubble formation at or near the surface of the article. A variant of this approach is to utilize only non-aggressive solvents which reduces solvent penetration and compromises dye density, for example, U.S. Pat. No. 4,043,637 to Hovey, and U.S. Pat. No. 4,323,597 to Olson.

SUMMARY OF THE INVENTION

Our invention comprises treating the surface of a previously formed article of plastic material with one or more solvents aggressive to the plastic material having one or more dyes dissolved in the solvent and having further dissolved in the solvent one or more substances capable of plasticizing the material. It is preferable that the material have no plasticizer in it prior to formation of the article, since such would reduce the rigidity, strength and the mechanical properties of the formed article. The aggressive solvent enables penetration to depths in excess of 100 microns to achieve excellent dye density. The plasticizer is thought to provide sufficient polymer mobility to allow the solvent to almost completely escape during subsequent heating without causing bubbling, hazing or crazing. The extent of degradation of mechanical surface properties of the plastic article caused by retained plasticizer is negligible. It is the object of our invention to prevent bubbling and hazing of the surface of an article formed of a plastic material into the surface of which has been infused one or more dyes dissolved in one or more solvents each aggressive to the plastic by also dissolving in the solution one or more substances each capable of plasticizing the plastic material.

DESCRIPTION OF THE PREFERRED EMBODIMENTS

In the manufacture of optical devices, such as lenses, various dyes may be incorporated therein to affect the optical transmission characteristics. These dyes may include photochromic dyes, cosmetic tinting dyes, infrared absorbing dyes, laser radiation absorbing dyes and ultraviolet absorbing dyes. A combination of dyes may also be employed, for example, an ultraviolet absorbing dye to prevent premature deterioration of a photochromic dye. Suitable photochromic dyes include palatinate purple, sea green, corn yellow and berry red which may be obtained from James Robinson, Ltd. of Huddersfield, United Kingdom.

A solvent aggressive to the plastic and also capable of dissolving the dye and a plasticizer is selected. An aggressive solvent is one which has a solubility parameter $\delta$ which, according to the theorem of Hildebrand, is within plus or minus 1 of the solubility parameter of the plastic when measured in $(cal/cm^3)^{0.5}$. Polycarbonate for example has a solubility parameter $\delta$ of 9.8 $(cal/cm^3)^{0.5}$. Suitable aggressive solvents for polycarbonate are tetrahydrofuran ($C_4H_6O$, $\delta=9.1$) and chlorinated hydrocarbons, for example, chloroform ($CHCl_3$, $\delta=9.3$), methylene chloride ($CH_2Cl_2$, $\delta=9.7$) and dichlorobenzene ($C_6H_4Cl_2$, $\delta=10.0$). The aggressive nature of the solvent allows the dye to penetrate to a sufficient depth of 75 to 150 microns below the surface of the article, enabling good dye density. A combination of aggressive solvents may be used. The use of non-aggressive solvents is disadvantageous because they do not provide sufficient dye penetration and further may be difficult to drive off. Although acetone has a solubility parameter of 9.9, its use should be avoided, since it is too volatile and causes crystallization of polycarbonate. Further, dodecanol-1, having a solubility parameter of 9.8, is not recommended because even higher alcohols are somewhat hydrophilic and tend to absorb water vapor.

Plasticizers are sometimes used during manufacturing to give an otherwise rigid plastic flexibility; but as previously indicated we prefer that the plastic have no plasticizer prior to formation of the article. In the present application, the infused plasticizer provides local surface mobility to the plastic matrix, allowing the deeply penetrating solvent to almost completely evaporate during subsequent heating. Where the plastic is polycarbonate, the plasticizer may be selected from the following table which includes both acid and alcohol moieties.

TABLE 1

Listing of Acceptable Plasticizers

| Trade Name | Chemical Name | Chemical Formula |
|---|---|---|
| Benzoflex ™ P-200 | Polyethyleneglycol dibenzoate | $(C_2H_4O)_4C_{14}H_{18}O_3$ |
| Benzoflex ™ S-552 | Pentacrythritol tetrabenzoate | $C_{13}H_{18}O_6$ |
| DOP | Diectyl phthalate 98% | $C_6H_4\text{-}1,2\text{-}(CO_2CH_3)_2$ |
| DPP | Dipropyl phthalate 99% | $C_6H_4\text{-}1,2\text{-}(CO_2CH_3CH_2CH_3)_2$ |
| DMP | Dimethyl phthalate 99% | $C_6H_4\text{-}1,2\text{-}(CO_2CH_3CH(C_2H_3)CH_2)CH_1)_3$ |
| DOA | Dioctyl Adipate 99% | $C_{22}H_{12}O_4$ |
| DOS | Dioctyl Schacate 99% | $(-CH_3CH_4CO_2CH_8CH(C_2H_6)CH_1)_6)_5$ |

One or more of these plasticizers may be used in combination. The plasticizers sold under the trademark BENZOFLEX® may be obtained from Velsicol Chemical Corporation of Rosemont, Ill.

The treating solution comprises the aggressive solvent or solvents, typically 1% to 4%, or more, by weight of plasticizer dissolved in the solvent and a conventional quantity of dye dissolved in the solvent. As a general rule, it is preferable to use the minimum concentration of plasticizer necessary to achieve the desired result. The polycarbonate article is contacted with the solution for at least ten seconds, but generally not more than one minute. In the case of a lens, one or both surfaces of the lens may be coated with the solution or the lens may be completely immersed in the solution. In the case of immersion, the article is removed from the solution at a uniform withdrawal rate. The solvent is then evaporated from the surface layer of the article by annealing. In practice, annealing consisted of heating the article from 85° F. to 265° F. in four hours and then cooling the article from 265° F. to 85° F. in one hour. It will be appreciated that the maximum temperature is appreciably less than the glass transition temperature of polycarbonate of 305° F.=152° C.

The resulting dyed article is transparent, having a surface layer with a depth of the order of 75 to 150 microns, which contains the infused dye and plasticizer and, likely, trace amounts of retained solvent, which in larger amounts would cause bubbling, hazing or crazing.

When polycarbonate lenses were contacted with chloroform containing no plasticizer, the lenses became hazy and developed bubbles after annealing.

A lens contacted with chloroform containing 1% of either of the BENZOFLEX® plasticizers had some bubbling and hazing after annealing. Increasing the concentration of plasticizer to 4% provided undetectable bubbling and haze after annealing. The remaining plasticizers caused no haze at 1% concentrations and no bubbling at 4% concentrations. The results of tests appear in the following table. It will be understood that a 4% plasticizer concentration may be achieved by combining any four of the above plasticizers in 1% concentrations each.

| Plasticizer Trade Name | C neentration | Bubbles after annealing | Haze |
|---|---|---|---|
| Control | No plasticizer | Yes | Yes |
| P-200 | 1% | Reduced in size | Reduced |
| | 2% | Same | Same |
| | 3% | Slightly less | Same |
| | 4% | None | None |
| S-552 Solid | 1% | Reduced | Greatly reduced |
| | 2% | More reduced | Same |
| | 3% | Same | Reduced |
| | 4% | None | None |
| DOP 98% | 1% | Reduced | None |
| | 2% | More reduced | None |
| | 3% | More reduced | None |
| | 4% | None | None |
| DPP 99% | 1% | Greatly reduced | None |
| | 2% | Reduced | None |
| | 3% | Reduced | None |
| | 4% | None | None |
| DMP 99% | 1% | Greatly reduced | None |
| | 2% | Reduced | None |
| | 3% | Same | None |
| | 4% | None | None |
| DOA 99% | 1% | Reduced | None |
| | 5% | None | None |
| | 8% | None | None |
| DOS 99% | 1% | Reduced | None |
| | 2% | None | None |
| | 3% | None | None |
| | 4% | None | None |

Plastics other than polycarbonate would include polymethyl methacrylate (PMMA), δ=9.09, and polycarbonate-polyester copolymers (LEXAN), for which the foregoing solvents and plasticizers would be suitable, polystyrene (PS), δ=8.56, for which carbon tetrachloride, δ=8.6, methyl isopropyl ketone, δ=8.5, and propyl propionate, δ=8.5, would be suitable solvents and for which the foregoing phthalate plasticizers would be suitable, and polyethylene terephthalate (PET), δ=9.5, for which chlorobenzene, δ=9.5, and chlorostyrene, δ=9.5, would be suitable solvents and for which the foregoing phthalate plasticizers would be suitable. The glass transition temperature of polycarbonate is roughly 152° C., while that of PMMA is 105° C., that of PS is 100° C., and that of PET is 80° C. Of these thermoplastics, polycarbonate is the one for which our invention is especially useful, since for the other thermoplastics, there would be reduced dye degradation at the lower molding temperatures. It will further be understood that the maximum annealing temperature in each instance would be reduced to appreciably less than the glass transition temperature.

It will be seen that we have accomplished the object of our invention. We have prevented bubbling and hazing of the surface of an article formed of a plastic material into which has been infused a dye dissolved in a solvent aggressive to the plastic. This advantageous result is achieved by also dissolving in the solvent one or more substances each capable of plasticizing the material.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of photochromically dyeing an optical plastic lens by infusing a photochromic dye into a surface of the optical plastic lens having a solubility parameter δ, comprising the steps of:

dissolving a photochromic dye and a plasticizer into an aggressive solvent having a solubility parameter δ within plus or minus 1 $(cal/cm^2)^{0.5}$ of the solubility parameter δ of the optical plastic lens to form a solution;

contacting the surface of the optical plastic lens with the solution; and, evaporating the solvent to form a photochromic lens without having the aggressive solvent substantially affect optical transmissivity of the lens.

2. The method of claim 1, wherein the optical plastic lens comprises a plastic matrix and the dissolved plasticizer in the solution provides local surface mobility to the plastic matrix.

3. The method of claim 1, wherein the surface is contacted with the solution for less than about one minute.

4. The method of claim 1, wherein the lens contains a further dye is selected from the group consisting of a cosmetic tinting dye, an infrared absorbing dye, a laser radiation absorbing dye, an ultraviolet absorbing dye and combinations thereof.

5. The method of claim 1, wherein the photochromic dye and the plasticizer are infrared up to about 150 microns deep into the surface.

6. The method of claim 1, further comprising the step of: heating the optical plastic lens to evaporate the solvent, following said contacting step.

7. The method of claim 6, wherein the optical plastic lens is heated to a temperature below the glass transition temperature of the optical plastic lens.

8. The method of claim 1, wherein the optical plastic lens comprises polycarbonate and the solvent is selected from the group consisting of tetrahydrofuran, a chlorinated hydrocarbon, and combinations thereof.

9. The method of claim 8, wherein the plasticizer is selected from the group consisting of polyethyleneglycol dibenzoate, pentaerythritol tetrabenzoate, dioctyl phthalate, dipropyl phthalate, dimethyl phthalate, dioctyl adipate and dioctyl sebacate.

10. The method of claim 1, wherein
the optical plastic lens is selected from the group consisting of polymethyl methacrylate and polycarbonate-polyester copolymers; and
the solvent is selected from the group consisting of tetrahydrofuran, a chlorinated hydrocarbon, and combinations thereof.

11. The method of claim 10, wherein the plasticizer is selected from the group consisting of polyethyleneglycol dibenzoate, pentaerythritol tetrabenzoate, dioctyl phthalate, dipropyl phthalate, dimethyl phthalate, dioctyl adipate and dioctyl sebacate.

12. The method of claim 1, wherein the optical plastic lens comprises polystyrene and the solvent is selected from the group consisting of tetrachloride, methyl isopropyl ketone, and propyl propionate, and combinations thereof.

13. The method of claim 12, wherein the plasticizer is selected from the group consisting of dioctyl phthalate, dipropyl phthalate, and dimethyl phthalate.

14. The method of claim 1, wherein the optical plastic lens comprises polyethylene terephthalate and the solvent is a chlorinated hydrocarbon, and combinations of chlorinated hydrocarbons thereof.

15. The method of claim 14, wherein the solvent is selected from the group consisting of chlorobenzene and chlorostyrene, and combinations thereof.

16. The method of claim 15, wherein the plasticizer is selected from the group consisting of dioctyl phthalate, dipropyl phthalate, and dimethyl phthalate.

17. A photochromic optical plastic lens having a mixture included therein by a solvent comprising:
an optical plastic lens having a surface and a solubility parameter δ; and
a mixture of a photochromic dye and a plasticizer infused into the surface, with said mixture having been infused while being dissolved in an aggressive solvent having a solubility parameter δ within plus or minus 1 (cal/cm$^2$)$^{0.5}$ of the solubility parameter δ of the optical plastic lens, wherein the solvent is evaporated to form the photochromic lens without having the solvent substantially affect optical transmissivity of the lens.

18. The lens of claim 17, wherein the optical plastic lens comprises a plastic matrix and the plasticizer provides local surface mobility to the plastic matrix.

19. The lens of claim 17, wherein the lens contains a further dye is selected from the group consisting of a cosmetic tinting dye, an infrared absorbing dye, a laser radiation absorbing dye, an ultraviolet absorbing dye and combinations thereof.

20. The lens of claim 17, wherein the photochromic dye and the plasticizer are infused up to about 150 microns deep into the surface.

21. The lens of claim 17, wherein the optical plastic lens comprises polycarbonate and the solvent is selected from the group consisting of tetrahydrofuran, a chlorinated hydrocarbon, and combinations thereof.

22. The lens of claim 21, wherein the plasticizer is selected from the group consisting of polyethyleneglycol dibenzoate, pentaerythritol tetrabenzoate, dioctyl phthalate, dipropyl phthalate, dimethyl phthalate, dioctyl adipate and dioctyl sebacate.

23. The lens of claim 17, wherein
the optical plastic lens is selected from the group consisting of polymethyl methacrylate and polycarbonate-polyester copolymer; and
the solvent is selected from the group consisting of tetrahydrofuran, a chlorinated hydrocarbon, and combinations thereof.

24. The lens of claim 23, wherein the plasticizer is selected from the group consisting of polyethyleneglycol dibenzoate, pentaerythritol tetrabenzoate, dioctyl phthalate, dipropyl phthalate, dimethyl phthalate, dioctyl adipate and dioctyl sebacate.

25. The lens of claim 17, wherein the optical plastic lens comprises polystyrene and the solvent is selected from the group consisting of tetrachloride, methyl isopropyl ketone, and propyl propionate, and combinations thereof.

26. The lens of claim 25, wherein the plasticizer is selected from the group consisting of dioctyl phthalate, dipropyl phthalate, and dimethyl phthalate.

27. The lens of claim 17, wherein the optical plastic lens comprises polyethylene terephthalate and the solvent is a chlorinated hydrocarbon, and combinations of chlorinated hydrocarbons thereof.

28. The lens of claim 27, wherein the solvent is selected from the group consisting of chlorobenzene and chlorostyrene, and combinations thereof.

29. The lens of claim 28, wherein the plasticizer is selected from the group consisting of dioctyl phthalate, dipropyl phthalate, and dimethyl phthalate.

* * * * *

UNITED STATES PATENT AND TRADEMARK OFFICE
CERTIFICATE OF CORRECTION

PATENT NO. : 6,719,812 B1
DATED : April 13, 2004
INVENTOR(S) : Paresh V. Kitchloo and Robert A. Sallavanti It is certified that error appears in the above-identified patent and that said Letters Patent is hereby corrected as shown below:

Column 2,
Lines 42-58, delete the entire Table 1 and insert the following:

-- Table 1 - Listing of Acceptable Plasticizers

| Trade Name | Chemical Name | Chemical Formula |
|---|---|---|
| Benzoflex® P-200 | Polyethyleneglycol dibenzoate | $(C_2H_4O)_4C_{14}H_{10}O_3$ |
| Benzoflex® S-552 | Pentaerythritol tetrabenzoate | $C_{33}H_{28}O_8$ |
| DOP | Dioctyl phtalate 98% | $C_6H_4\text{-}1,2\text{-}(CO_2CH_3)_2$ |
| DPP | Dipropyl phthalate 99% | $C_6H_4\text{-}1,2\text{-}(CO_2CH_2CH_2CH_3)_2$ |
| DMP | Dimethyl phthalate 99% | $C_6H_4\text{-}1,2\text{-}[CO_2CH_2CH(C_2H_5)(CH_2)CH_3]_2$ |
| DOA | Dioctyl Adipate 99% | $C_{22}H_{42}O_4$ |
| DOS | Dioctyl Sebacate 99% | $[\text{-}CH_2CH_2CO_2CH_2CH(C_2H_5)(CH_2)_3]_2$ |

--

Column 4,
Line 36, delete "$(cal/cm^2)^{0.5}$" and substitute -- $(cal/cm^3)^{0.5}$ --
Line 53, delete "is"
Line 58, delete "infrared" and substitute -- infused --

Column 5,
Line 39, delete "included" and substitute -- infused --
Line 46, delete "$cm^2)^{0.5}$" and substitute -- $cm^3)^{0.5}$ --

Column 6,
Line 5, delete "is"
Line 23, delete "copolymer;" and replace with -- copolymers; --

Signed and Sealed this

Sixteenth Day of November, 2004

JON W. DUDAS
*Director of the United States Patent and Trademark Office*